(No Model.)
J. A. MALONEY.
ELECTROPHORE OR SECONDARY BATTERY.
No. 247,934. Patented Oct. 4, 1881.
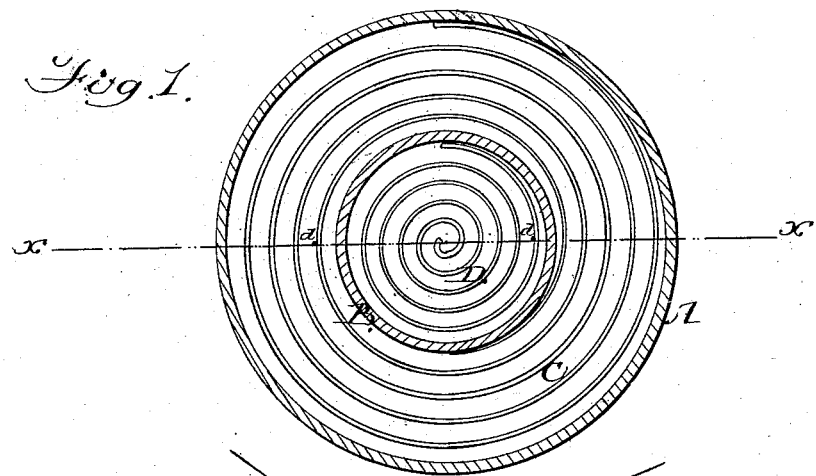
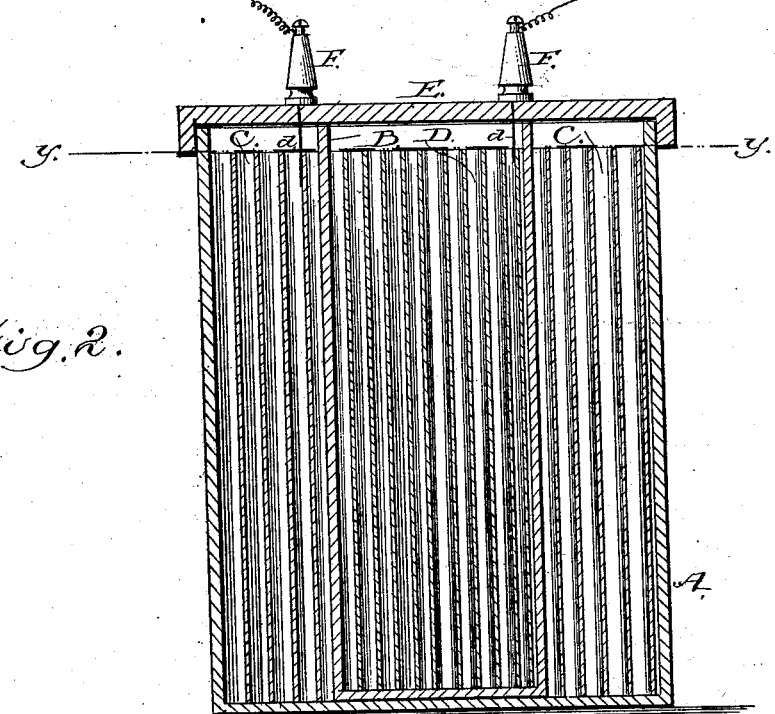
Witnesses:
S. Walter Fowler,
Inventor
James A. Maloney

UNITED STATES PATENT OFFICE.

JAMES A. MALONEY, OF WASHINGTON, D. C., ASSIGNOR, BY DIRECT AND MESNE ASSIGNMENTS, TO THE AMERICAN ELECTROPHORE COMPANY, OF SAME PLACE.

ELECTROPHORE OR SECONDARY BATTERY.

SPECIFICATION forming part of Letters Patent No. 247,934, dated October 4, 1881.

Application filed July 6, 1881. (No model.)

*To all whom it may concern:*

Be it known that I, JAMES A. MALONEY, of Washington city, in the county of Washington and District of Columbia, have invented an Improvement in Electrophores or Secondary Batteries; and I do hereby declare the following to be a full, clear, and exact description of the same, reference being had to the accompanying drawings and the letters of reference marked thereon.

In the drawings, Figure 1 represents a sectional view of an electrophore on the line $y\,y$ of Fig. 2. Fig. 2 is a vertical section on the line $x\,x$, Fig. 1.

A represents a receptacle of any non-conducting material. B is a porous cup containing a coil of sheet-lead coated with red lead; C, a coil of sheet-lead, also coated with red lead and filling the space between the porous cup B and the receptacle A. E is a cap or cover to receptacle A; F F, binding-posts; $d$ $d$, electrodes.

My invention relates to a novel process of preparing and using electrophores; and it consists in the use of acidulated water during the process of polarizing the leaden plates or coils only, after which water alone is used to submerge the coils.

To enable others skilled in the art to make and use my invention, I will now proceed to describe its operation.

The device represented in the drawings being ready to be converted into an electrophore or secondary battery, it is filled with acidulated water and then placed in circuit with a generator of current, to wit: the coil to become + is connected with the + of the generator of current or battery, and the coil to become − is connected with the − of generator or battery. It is then allowed to remain in circuit until each coil has become polarized—*i. e.*, the + coil becomes light-gray or white and the − coil becomes a reddish purple or nearly black, through electrolytic deposition. When this stage has been reached the acidulated water is emptied from the receptacle and replaced by water without acid.

By this process and means for storing electric currents many disadvantages arising from the use of acidulated water after polarization of the plates are overcome, chief among which is a better effect when in circuit with an electric light, and, again, the liability of acid-water injuring surrounding objects while handling or *in transitu* is obviated.

With the use of water without acid economy is obvious; but the time required for charging is somewhat more prolonged than when acidulated water is used. The only use for a fluid after polarization of the coils is merely to complete the circuit in the receptacle. After polarization is completed, and the acidulated water is replaced by water without acid, the plates will retain their polarization without such decomposition of fluid as takes place during the process of polarization by the use of acidulated water, as actual experiment demonstrates.

Having thus described my invention, what I claim as new, and desire to secure by Letters Patent of the United States, is—

The process of preparing electrophores or secondary batteries for use which consists in first submerging the metal coils in acidulated water, and then placing the device in an electric circuit for the purpose of polarizing the leaden coils or plates, and, secondly, in subsequently replacing the acidulated water with water without acid for the purpose of conducting the current to the respective polarized plates, substantially as and for the purpose set forth.

JAMES A. MALONEY.

Witnesses:
GEO. M. LOCKWOOD,
W. P. CHAFFEE.